United States Patent [19]
Bonet Sirera

[11] 3,822,106
[45] July 2, 1974

[54] APPARATUS FOR MOLDING TUBES OF FIBEROUS CEMENT AND ORIENTING THE FIBERS THEREIN

[75] Inventor: Sebastian Bonet Sirera, Valencia, Spain

[73] Assignee: Phillips Petroleum Company

[22] Filed: Nov. 8, 1971

[21] Appl. No.: 196,573

[30] Foreign Application Priority Data
Nov. 9, 1970  Spain .................................. 385343
Nov. 27, 1970  Spain .................................. 385941

[52] U.S. Cl............... 425/84, 249/65, 425/427
[51] Int. Cl............................................. B28b 7/32
[58] Field of Search ........... 425/417, 418, 84, 427, 425/384, 392, DIG. 43, DIG. 119, 417, 468, 425/DIG. 44, DIG. 112; 249/152, 65, 178, 183

[56] References Cited
UNITED STATES PATENTS

| | | | |
|---|---|---|---|
| 2,052,818 | 9/1936 | Freyssinet | 425/84 X |
| 2,170,188 | 8/1939 | Cobi | 249/65 |
| 2,361,933 | 11/1944 | Ferla | 425/84 X |
| 2,562,299 | 7/1951 | Crouch | 249/65 X |
| 2,730,783 | 1/1956 | Kennison | 425/84 |
| 2,870,513 | 1/1959 | Gagne | 425/427 X |
| 3,257,690 | 6/1966 | Scott | 249/65 X |
| 3,290,728 | 12/1966 | Pratt | 249/178 |
| 3,414,951 | 12/1968 | Schulze | 425/427 X |
| 3,561,079 | 2/1971 | Anderson | 425/417 |
| 3,598,357 | 8/1971 | McLean | 249/65 |
| 3,610,563 | 10/1971 | Allen | 249/65 |
| 3,674,394 | 7/1972 | Wiltshire | 249/65 X |

*Primary Examiner*—J. Spencer Overholser
*Assistant Examiner*—John S. Brown
*Attorney, Agent, or Firm*—Imirie and Smiley

[57] ABSTRACT

An apparatus for molding tubular members of fiberous cement, comprises a two part mold including a foraminous casing and an expansible core structure; means rotatably supporting at least one of said mold parts, and means for expanding and contracting said core to compress and express moisture from the cement and then release the compressed cement; said core structure including a flexible sleeve surrounding a foraminous core having longitudinal external ribs.

3 Claims, 6 Drawing Figures

APPARATUS FOR MOLDING TUBES OF FIBEROUS CEMENT AND ORIENTING THE FIBERS THEREIN

BACKGROUND OF THE INVENTION

Heretofore, manufacture of tubes having high resistance to internal pressure, collapse and flexure has involved a machine that spins unitary film around a mandrel. Known as Mazza's process, this method succeeds in producing tubes with high resistances and smooth internal surfaces. The production costs of Mazza's process, however, have proved high enough to inspire the proposal of alternative methods of tube manufacture, none of which has proved technically satisfactory.

One alternative type of tube manufacture is the injection system which involves the introduction of a fibrous paste or cement into a tubular mold that encloses a mandrel. In some embodiments the mold and/or the mandrel are equipped with a flexible lining or covering for compressing the material introduced. The major deficiency of this system heretofore has been its failure to induce a uniform orientation of the fibers in the paste, resulting in a finished product with inadequate resistances to the various pressures hereinbefore mentioned. It is this deficiency that the present invention remedies.

SUMMARY OF THE INVENTION

The present invention resides in a machine capable of producing tubular members of fibrous cement with a sufficiently uniform orientation of the fibers in said cement to reinforce the members against adverse pressures. This is accomplished by an apparatus comprising a three-part mold including an elongate foraminous casing, an elongate foraminous core extending longitudinally through said casing, and an elongate impervious flexible sleeve surrounding said core. Means are provided for rotation of the core within the casing, and the core itself is equipped with circumferentially spaced longitudinal projections or ribs. Means are connected with the core for supplying or extracting fluid pressure to expand and contract the aforementioned sleeve.

As fibrous paste enters the mold the core rotates, imparting to said paste, by means of said longitudinal ribs, a revolving movement around said core. The effect of the revolving movement on the plastic fibrous paste or cement is twofold: the paste spreads evenly throughout the mold thereby gaining homogeneity and uniformity of density; and the fibers in the paste gradually assume a uniformity of orientation in the direction of revolution. A vacuum effect can be created within the core which causes the aforementioned sleeve to conform to the contour of said core and the longitudinal ribs projecting from the core, thereby acting upon the plastic cement.

When the quantity of cement necessary for the manufacture of the desired tube has been injected into the mold, and when said cement has assumed the desired density, the pressure within the foraminous core can be raised so as to expand the impervious sleeve surrounding said core. By expanding to a certain degree said sleeve adopts a cylindrical configuration with a diameter approximately equal to that circumscribed by the ribs of the core during rotation. During this period of expansion, the sleeve is supported and stabilized by said ribs.

The expansion of the sleeve in conjunction with continued rotation of the core produces three desirable effects: it compacts the fibrous paste; expels superfluous liquid through the foraminous casing; and smooths the internal surface of the tube manufactured. Upon completion of this stage of the process, the mold is opened, the sleeve contracted and the core and sleeve are extracted and the finished product, a tubular member with high resistances to internal pressure, collapse and flexure and with an extremely smooth internal surface, is removed.

DETAILED DESCRIPTION OF THE INVENTION

Figure 1:
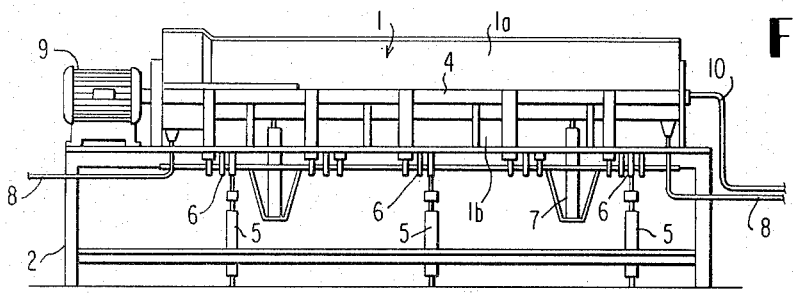
FIG. 1 is a side view in elevation of a molding apparatus according to invention.
Figure 6:
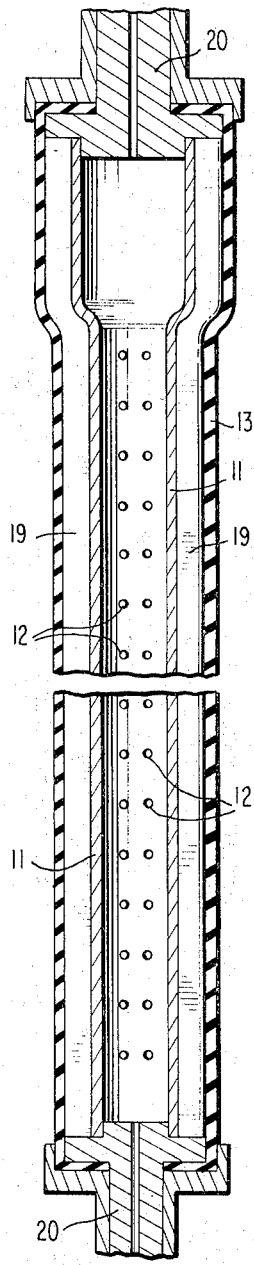
FIG. 6 is a longitudinal cross-sectional view of the mold core taken on line 6—6 of FIG. 5.
Figure 2:
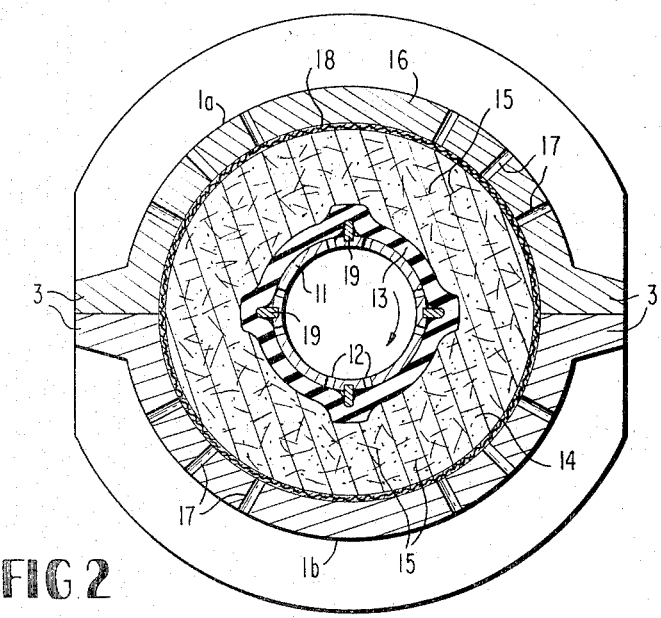
FIG. 2 is a transverse cross-sectional view of a mold according to the invention.

A molding apparatus according to the invention, as better shown in FIG. 2, comprises a casing 1 including two separable sections 1a and 1b, each composed of a shell 16 having perforations 17 and enclosing a foraminous liner 18 which, in turn, is lined with a filtering material. The two separable sections 1a and 1b have longitudinally extending laterally extending flanges 3 projecting from their abutting edges. As shown in FIG. 1, the lower section 1b is supported by a frame 2, the upper section 1a being removable, and the sections are secured together by clamp means 4 cooperative with the flanges 3 and fluid operating jacks 5, connecting rods and bars 6.

Cylinders and levers 7 facilitate separating and joining of the mold sections 1a, 1b. Ducts 8 provide for the injection of fibrous paste or cement at either end of the mold for the injection of plastic paste, such as fibrous cement into a mold chamber defined by the casing 1 and an axial core structure. A motor 9 provides rotation of the core structure of the mold. A duct 10 is connected to the core structure to vary fluid pressures therein.

The core structure of a mold according to the invention, as shown in FIGS. 2–6 comprises an elongate hollow core member 11 having perforations 12, circumferentially spaced, radial, longitudinal projections or ribs 19 and an impervious flexible sleeve 13 surrounding said core. Preferably, the sleeve 13 has its end portions secured with the end cap-journal portions 20 fixed with and rotatably supporting the core 11.

Figure 3:
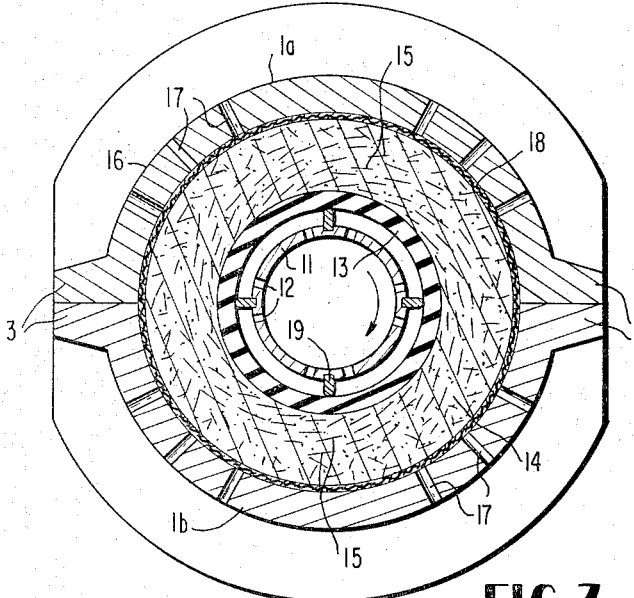
FIG. 3 is a cross-sectional view similar to that of FIG. 2 but with parts in the positioned assumed during a stage of the molding process.
Figure 4:
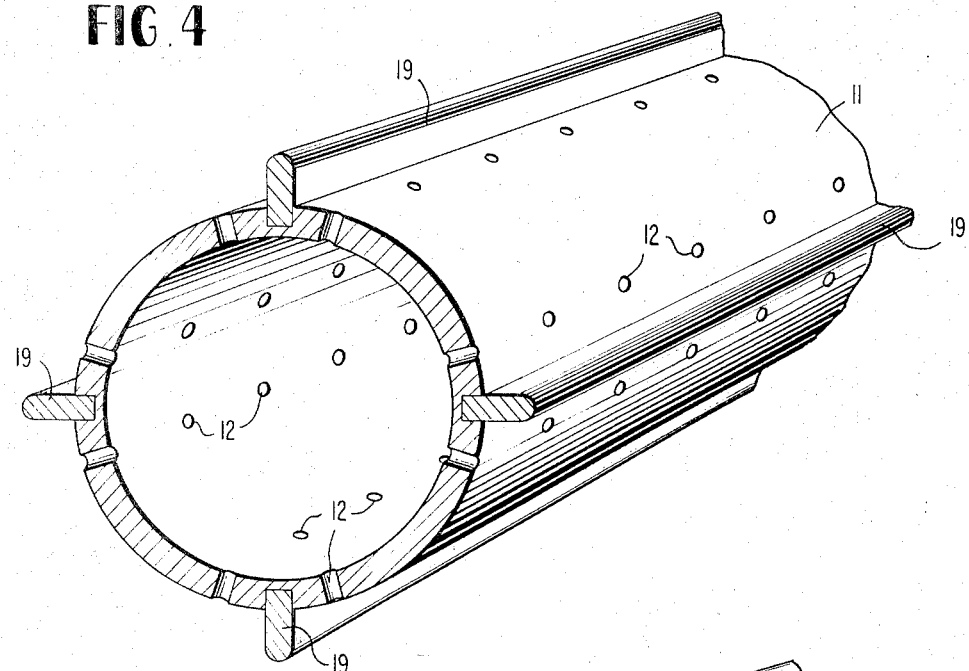
FIG. 4 is an enlarged fragmentary view in perspective of a section of the mold core.
Figure 5:
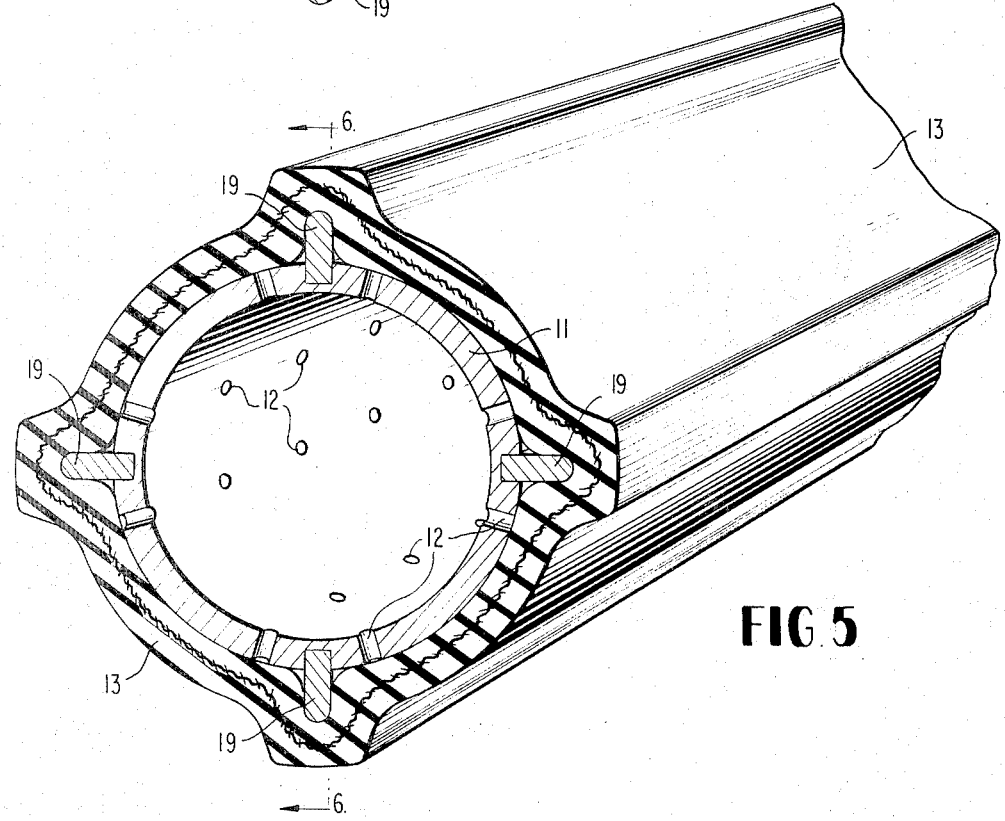
FIG. 5 is a view similar to FIG. 4 but including the flexible sleeve surrounding the core.

Fluid pressure within the core 11 is varied to collapse the sleeve 13 around the core as shown in FIGS. 2 and 5, or expand the sleeve 13, as shown in FIG. 3, into a cylinder. Thus, when the sleeve 13 is collapsed, as shown in FIGS. 2 and 5, so that it follows the contours of the ribs 19, it defines longitudinal projections extending into the area of the mold chamber and rotation of the assembly serves to agitate the surrounding plastic fibrous cement to orient the fiber's therein to improve resistance to the pressure to which the molded product will be subjected.

In the operation of the molding apparatus, the mold sections 1a, 1b are closed by the jacks 7 and secured together by their flanges 3 through clamp means 4 and fluid-operated jacks 5, fibrous paste or cement is introduced to the mold chamber through feeding ducts 8. Simultaneous with this introduction is the creation of a vacuum in the perforated core 11 by extraction of its fluid contents through the duct 10; and initiation of rotation of said core by means of the motor 9.

As shown in FIG. 2, the vacuum created in the foraminous core 11 causes the flexible sleeve enveloping said core to conform fully to the configuration of the core, thus creating radial, longitudinally extending projections conforming to the ribs 19 which, due to rotation of the core, impart a revolving movement to the fibrous paste or cement 14. This revolving movement causes the fibers 15 of said paste to assume a uniform orientation as said paste is compressed toward the liner 18 of the mold casing 1.

This procedure continues with the paste being intermittently introduced to the chamber so as to produce an accretion of paste layers with uniform orientation of paste fibers. When the appropriate amount of cement has been injected into the mold chamber and said cement has reached the necessary density, the pressure in the core 11 of the mold is increased by injection of fluid into said core through duct 10 (FIG. 1). The fluid passes through the perforations 12 of the core 11 causing the impervious flexible sleeve 13 to expand, as shown in FIG. 3.

This expansion of the sleeve 13 compresses the paste or cement 14 and causes the expulsion of excess liquid therein through foraminous liner 18 and the perforations 17 of casing 1 enclosing the chamber. The filtering textile seated by the liner 18 prevents the escape of any paste during this period of compression. During this stage of operation the core 11 continues to rotate, furnishing the finished product with a smooth internal surface. The operation of the mold is completed by stopping the rotation of the core, releasing the pressure within said core, then separating the mold sections 1a, 1b in order to remove the manufactured tube.

I claim:

1. Apparatus for molding tubular members of fiberous cement comprising
   a two part mold including an expansible core structure and a cylindrical foraminous casing spacedly surrounding the core structure and defining therewith a mold chamber into which fibrous paste is introduced,
   means rotatably supporting at least one of said mold parts,
   said core structure including a rigid cylindrical foraminous tube and a flexible impervious sleeve surrounding said tube,
   means for supplying suction to the interior of the core sleeve to collapse it onto the core tube so that it follows the contours of the ribs that define projections extending radially into and longitudinally along the mold chamber whereby upon relative rotation between the casing and the core structure a revolving movement is imparted to the fibrous paste so as to uniformly orient the fibers in the paste, and
   means for supplying a fluid pressure to the interior of the core sleeve to cause the core sleeve to expand into a cylindrical shape and compress the paste against the casing.

2. Apparatus for molding tubular members of fiberous cement comprising
   a three part mold including an elongate cylindrical foraminous casing, an elongate foraminous core extending longitudinally through said casing, and an elongate impervious flexible sleeve surrounding said core, said casing being radially spaced from the core to define therewith a mold chamber into which fibrous paste is introduced,
   means supporting said core for rotation within said casing,
   circumferentially spaced longitudinally extending radially disposed ribs fixedly provided on said core
   means for supplying suction to the interior of the core sleeve to collapse it onto the core tube so that it follows the contours of the ribs that define projections extending radially into and longitudinally along the mold chamber whereby upon rotation of the core within the casing a revolving movement is imparted to the fibrous paste so as to uniformly orient the fibers in the paste, and
   means for supplying a fluid pressure to the interior of the core sleeve to cause the core sleeve to expand into a cylindrical shape and compress the paste against the casing.

3. Apparatus according to claim 2 wherein the end portions of said sleeve and core are secured together for simultaneous rotation.

* * * * *

UNITED STATES PATENT OFFICE
CERTIFICATE OF CORRECTION

Patent No. 3,822,106    Dated July 2, 1974

Inventor(s) Sebastian BONET SIRERA

It is certified that error appears in the above-identified patent and that said Letters Patent are hereby corrected as shown below:

"[73] Assignee: Phillips Petroleum Company"

should read:

--[73] Assignee: Uralita, S.A., Madrid, Spain --

Signed and sealed this 22nd day of October 1974.

(SEAL)
Attest:

McCOY M. GIBSON JR.
Attesting Officer

C. MARSHALL DANN
Commissioner of Patents